(12) United States Patent
Jaramillo

(10) Patent No.: US 7,403,908 B1
(45) Date of Patent: Jul. 22, 2008

(54) DEVICES, SYSTEMS, AND METHODS FOR SOLVING CHALLENGES IN TELECOM AND SALES MARKETING

(75) Inventor: Randolph A. Jaramillo, Lake Forest, CA (US)

(73) Assignee: Hothand, Inc., Lake Forest, CA (US)

( * ) Notice: Subject to any disclaimer, the term of this patent is extended or adjusted under 35 U.S.C. 154(b) by 845 days.

(21) Appl. No.: 10/094,379

(22) Filed: Mar. 8, 2002

Related U.S. Application Data

(60) Provisional application No. 60/303,615, filed on Jul. 6, 2001.

(51) Int. Cl.
*G06F 17/60* (2006.01)

(52) U.S. Cl. .................... 705/16; 705/1; 705/26

(58) Field of Classification Search .......... 705/1, 705/5, 16, 26

See application file for complete search history.

(56) References Cited

U.S. PATENT DOCUMENTS

| | | | | |
|---|---|---|---|---|
| 5,774,870 A | * | 6/1998 | Storey | 705/14 |
| 5,999,914 A | * | 12/1999 | Blinn et al. | 705/26 |
| 6,055,513 A | * | 4/2000 | Katz et al. | 705/26 |
| 6,212,262 B1 | | 4/2001 | Kamel | |
| 6,267,672 B1 | | 7/2001 | Vance | |
| 6,473,739 B1 | * | 10/2002 | Showghi et al. | 705/26 |
| 6,671,358 B1 | * | 12/2003 | Seidman et al. | 379/93.12 |
| 6,769,607 B1 | * | 8/2004 | Pitroda et al. | 235/380 |
| 6,980,962 B1 | * | 12/2005 | Arganbright et al. | 705/26 |
| 2001/0034720 A1 | * | 10/2001 | Armes | 705/65 |
| 2002/0004753 A1 | * | 1/2002 | Perkowski | 705/26 |
| 2002/0042753 A1 | * | 4/2002 | Ortiz et al. | 705/26 |
| 2002/0194068 A1 | * | 12/2002 | Bishop et al. | 705/14 |
| 2002/0198774 A1 | * | 12/2002 | Weirich | 705/14 |
| 2003/0200008 A1 | * | 10/2003 | Wilson | 700/236 |

* cited by examiner

*Primary Examiner*—John G. Weiss
*Assistant Examiner*—Matthew S Meyers
(74) *Attorney, Agent, or Firm*—Mintz, Levin, Cohn, Ferris. Glovsky and Popeo PC

(57) ABSTRACT

Handheld communication devices, such as wireless phones, include one or more application programs that permit a person to sell handheld communication products at a point of contact with a potential customer. The methods reward the user of the handheld communication device by providing incentives for selling communication products. By purchasing the handheld communication devices, the customer may then sell other communication products to other customers. The sales of the handheld communication products result in an expanding network of customers and increased revenue for telecommunication companies.

18 Claims, 5 Drawing Sheets

DEVICES, SYSTEMS, AND METHODS FOR SOLVING CHALLENGES IN TELECOM AND SALES MARKETING

CROSS-REFERENCE TO RELATED APPLICATIONS

This application claims the benefit under 35 U.S.C. 119(e) of U.S. Provisional Application No. 60/303,615, filed Jul. 6, 2001, the content of which in its entirety is hereby incorporated by reference.

BACKGROUND OF THE INVENTION

Sales in the telecommunication (telecom) industry suffer from problems of generating significant profits due to substantial expenses required for advertising and labor, low customer retention rates, and high turnover rates in telecom company employees. Selling phones, such as wireless phones, is difficult, even for trained professionals. When a salesperson becomes successful, he is often promoted or becomes more involved with his customer care issues, which results in less time devoted to selling, and accordingly, less profits for the telecom company. Highly trained and highly paid experts are needed to service corporate accounts, which results in increased expenses.

In addition, it is difficult to generate sales when competitive products are very similar. For example, and in particular to wireless phones, the primary differences in products are the cost of the phone, the number of minutes per plan, the coverage area, or promotional accessories, such as batteries, cases, and battery chargers. These differences are insubstantial to most consumers, and telecom companies are frequently changing their programs and incentives in attempt to persuade potential customers. The fact that differences in telecom products are insubstantial is reflected in the high turnover rates in customers of companies. The customer turnover rates are high because it is difficult to prove that one particular product (e.g., wireless phone or service plan) or company is better than another.

Customers are also particularly aware of the issue of customer care or customer service. Companies with poor customer service typically have a difficult time retaining their customers.

One attempt to increase profits and decrease expenses in the telecom industry has been to reduce and/or eliminate the number of people involved in making a sale (e.g., disintermediation). Internet web sites have been developed to attempt to reduce advertising and labor costs. However, web sites have become ineffective because they do not attract enough potential customers to override the costs of spectrum acquisition, technology development, and advertising. An "effective" web site (e.g., a web site that generates more profits than the costs to develop and maintain the site) typically requires ongoing development and maintenance costs to streamline the process of ordering goods or services until a sufficient number of customers are familiarized with the products (i.e., goods and/or services) being sold. Because not enough people buy products through the web site, the web site becomes a substantial liability to the telecom company. Referral type incentives have been provided in attempt to increase the number of sales generated by a web site, but these incentives are ineffective because the credits and/or rebate promotions are self-limiting and do not create enough momentum in purchasing. For example, a customer may receive a sign-up bonus or benefit when he purchases a phone, but he will not continue to be rewarded during the length of his contract with the telecom company. Accordingly, the incentive is only as powerful as his own telephone needs.

Another major factor in selling a product is time decay (e.g., the time from the initial point of contact between a salesperson and a potential customer, or the time at which the potential customer is most interested in a product, until the time the potential customer actually purchases the product). Typically, too many negative distractions occur that reduce the likelihood of completing a sale. Examples of distractions include fatigue, lack of time to research and shop, hectic schedule, and no Internet connection. By the time a sales cycle is completed, ninety percent of the potential customers are no longer interested in purchasing the product. For example, if one person were to refer ten people to a web site of a telecom company, and if those ten referred people were later asked how many actually visited the web site, perhaps two or three people would answer that they had visited the web site. Of those twenty to thirty percent, perhaps one person would have proceeded to make a purchase from the web site. This results in only a ten percent efficiency in sales. Most people are not self-directed, and typically require "hands-on" guidance in order to follow through with a potential purchase.

Telecom companies have begun to realize that personal contact and "hands-on" approaches may be a more reliable method of generating profits than mere referral to a web site. Accordingly, these companies have begun developing relationships with multi-level organizations, hoping that word of mouth sales will stimulate sales. Unfortunately, if one were to research the potential sales, they would determine that the major buyers of such telecom products are the distributors themselves, and not the people outside of the distributor network. Consequently, this method is also self-limiting because one has to be a distributor to benefit from the program. Frequently, a sign-up fee adds to the initial cost before any purchasing benefit becomes a reality. The sign-up fee often becomes a major friction point for any potential distributor. In addition, there is a stigma attached to multi-level sales or marketing, and it is typically too difficult and complicated to succeed in selling the goods or services. Typically, distributors are unable to sell beyond their own networks. In addition, very few distributors have the capability or knowledge required to either answer questions about the technology built into the phone, or to explain the benefits of one product over another since no significant difference exists between the products, as mentioned above.

To address problems of retention, telecom companies typically require annual contracts for new customers. The contracts often impose a severe penalty on those customers who cancel the contract early. As a result, the annual contracts create a substantial friction between the telecom company and the customer.

As the third generation (3G) mobile telecommunications system (i.e., universal mobile telecommunications system) is developed and begins to enter the marketplace, the need for a marketing plan that effectively promotes a company's product will dramatically increase if the company wishes to acquire or maintain a significant portion of the market. In addition, in order to maintain a viable customer base when 3G products enter the market, companies will need to ease the transition of their existing customers over to the new type of communication devices and services.

Thus, there remains an unmet need for methods of increasing sales of telecommunication products, decreasing expenses associated with selling the products, and for retaining current customers.

SUMMARY OF THE INVENTION

The present invention addresses the aforementioned needs and provides methods of increasing sales and reducing costs associated with selling products. The inventive methods reduce time decay and simplify purchasing of products (i.e., goods and/or services). The invention provides methods of acquiring new customers, and retaining existing customers. The invention herein utilizes the Internet in a productive manner, substantially cuts labor costs, and reduces advertising expenses. These savings may be used to redirect capital spending to spectrum acquisition and customer care.

A method of selling portable handheld communication products, in one preferred approach, comprises the steps of: (a) providing a consumer with a portable handheld communication device; (b) inputting purchase transaction data for another consumer into the communication device; (c) transmitting the purchase transaction data for that consumer over a computer network to a data storage device, such as a database; and (d) rewarding the first consumer for completing the sale of the handheld communication product to the second consumer.

In another aspect of the invention, there is taught a method of selling portable handheld communication products which comprises the steps of: (a) providing a first consumer with a portable handheld communication device; (b) selecting an application in the communication device that permits ordering of handheld communication products; (c) activating a purchase order form; (d) inputting customer information data of a second consumer into the communication device; (e) inputting payment method data into the communication device; (f) selecting a handheld communication device to be purchased by the second consumer; (g) selecting a handheld communication service plan to be purchased by the second consumer; (h) transmitting the purchase order data over a computer network to a database that stores the data; and (j) rewarding the first consumer for the completion of a purchase by the second consumer. The method may also include the step of validating the purchase order.

The foregoing methods may be performed using a wireless phone by either speaking into the wireless phone, or inputting data by pressing a key on the wireless phone. The wireless phone permits the data to be transmitted over a wireless network, including a global communication network. The mobility of the handheld communication device permits the methods of selling handheld communication products at a point of contact between the first consumer and the second consumer. The consumers may be rewarded by accumulating reward points that may be redeemed for a reward, including cash, credits, rebates, stock options, and frequent flier miles. The methods of selling the communication products provide a method for the second consumer (i.e., the purchaser) to subsequently sell handheld communication products to generate increased sales for the telecom company and increased rewards for the consumer.

In practicing the foregoing methods, a portable handheld communication device for communicating over a wireless network may comprise, in one preferred embodiment, a housing having memory for storing programs and data, a processor for executing the programs stored in the memory, a data input device connected to the processor, which receives data input by a user, and an antenna operably connected to the processor to receive and transmit data over the wireless network. A display device is provided for displaying the data input by the user and the data received over the wireless network, and an application program is provided for selling handheld communication products to a consumer. The communication device may be a wireless telephone or a portable computer, and the data input device may be a keypad, a microphone, or a touch screen. The application program may comprise one or more forms for receiving purchase transaction data provided by the consumer, or for permitting the user to select a reward for completing the sale of a handheld communication product. In addition, or alternatively, the application program may include one or more fields for storing the purchase transaction data. The application program in the foregoing device may be executed at a point of contact between the consumer and the user of the handheld communication device.

Any feature or combination of features described herein are included within the scope of the present invention provided that the features included in any such combination are not mutually inconsistent as will be apparent from the context, this specification, and the knowledge of one of ordinary skill in the art.

Additional advantages and aspects of the present invention are apparent in the following detailed description and claims.

DETAILED DESCRIPTION OF THE INVENTION

Although the invention disclosed herein is described in particular reference to wireless telephones, the disclosure is not to be construed as being limited only to wireless telephones. The present invention encompasses any portable handheld communication devices including, at least, portable computers, such as personal digital assistants, and text messaging systems, such as two-way pagers, and mobile email communication tools, such as Research in Motion, Ltd.'s (RIM) Blackberry. In other words, the present invention encompasses handheld communication devices that are capable of communicating over computer networks, including wireless computer networks. The handheld communication devices of the present invention should be able to communicate with one or more handheld communication devices, and/or one or more computers operably connected to the computer network. In accordance with the present invention, the handheld communication device should be able to transmit data input by a user of the device to a data storage device, such as a computer, and more particularly, a database of the computer. In addition, the handheld communication device should be able to receive data over a computer network, for example, by the computer to which it transmitted the data.

Figure 1:
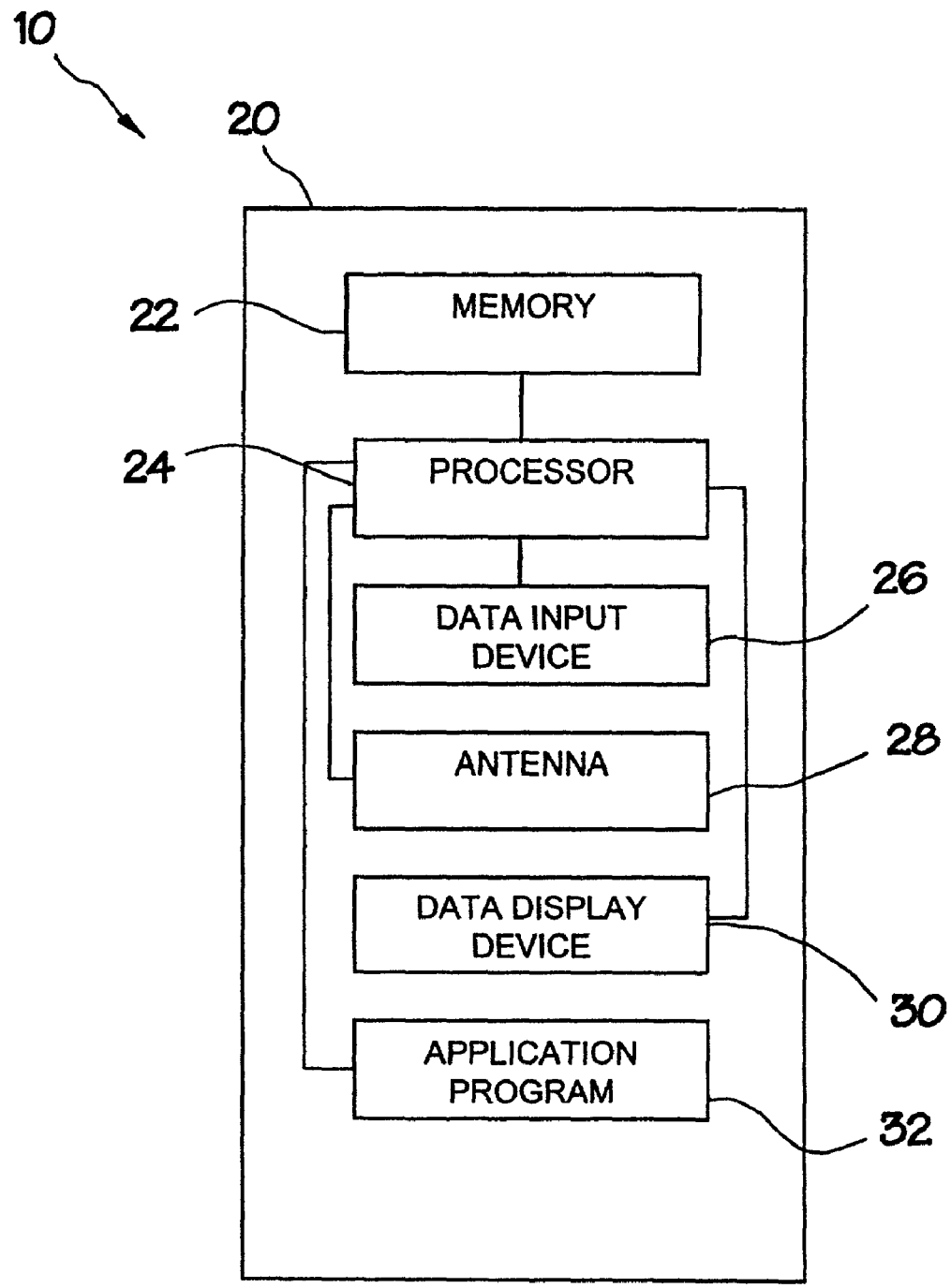
FIG. 1 is a block diagram of a handheld communication device, as described herein.

By way of example, and not by way of limitation, FIG. 1 illustrates a portable handheld communication device 10. Communication device 10 comprises a housing 20 having memory 22, one or more processors, such as microprocessors, 24, a data input device 26, an antenna 28, a data display device 30, and one or more application programs 32. Housing 10 is generally formed of a durable material, such as hardened plastic or metals, so that it may effectively house and protect the components of the device. Memory 22 is provided to store application programs and data. Examples of memory 22 include, but are not limited to, electrically programmable read-only memory (EPROM) and/or electrically erasable and programmable read-only memory (EEPROM). Other memory type structures may be employed. Memory 22 is operably connected to processor 24 so that processor 24 may execute one or more application programs stored in memory 22. Memory 22 may be electrically connected or optically connected to processor 24 so that digital signals may be communicated between processor 24 and memory 22. Processor 24 is operably connected to data input device 26, which permits a user of handheld communication device 10 to input data into memory 22 that can be acted upon by processor 24. Depending on the particular handheld communication device, examples of data input devices, or means for entering data into the communication device, include, but are not limited to, keypads, keyboards, microphones, and/or touch screens. Antenna 28 is operably connected to processor 24 so that signals generated by processor 24 may be transmitted from communication device 10 to one or more other communication devices that can receive the signals so transmitted. In addition, antenna 28 may receive signals from one or more communication devices and relays or communicate those signals to processor 24 so that the signals may be processed or otherwise stored in memory 22. Accordingly, antenna 28 is a component of both data transmitting means and data receiving means for the communication device. Display device 30 is operably connected to processor 24 so that it can display data input by the user of device 10 and/or data received by antenna 28. Additional components may be provided within the communication device, as understood by persons skilled in the art. Accordingly, any conventional portable handheld communication device may be used in accordance with the invention herein disclosed.

The handheld communication device 10 also includes one or more application programs 32. Application programs 32 may be stored in memory 22, and may be executed by processor 24, as described hereinabove. One particular application program is a program that enables the user of the communication device to sell other handheld communication products to other potential customers or consumers. Such application programs are means for selling handheld communication products. In reference to the disclosure herein, handheld communication products specifically include handheld communication goods, such as handheld communication devices, and related accessories, including, but not limited to, batteries, cases, data input devices, and decorative coverings, and handheld communication services, such as service plans, and/or warranties. Thus, using the device and/or the methods disclosed herein, a person may sell either handheld communication goods, handheld communication services, or both. For example, one may be able to call a wireless telephone and a calling plan for using the telephone. As used herein, a potential customer or a potential consumer is a person or entity that may be interested in purchasing, or can be persuaded to purchase, a handheld communication product. Examples of customers or consumers include friends, business associates, family members, and strangers.

The application program disclosed herein is a set of instructions that can be executed by processor 24 of handheld communication device 10. Application program 32 is executed to process purchase transaction data that is input into communication device 10. Purchase transaction data refers to data or information relevant to the purchase of a handheld communication product by a person. For example, purchase transaction data may include the person's name, identification number, such as a social security number, address, phone number, credit card information, such as credit card type, credit card number. Thus, purchase transaction data includes data necessary to complete a sale, as well as optional data that may be used for other purposes, such as marketing or advertising.

Application program 32 provides means for storing purchase transaction data that can be stored in one or more areas in memory 22. For example, application program 32 may provide one or more fields to receive and store (for example, temporarily store) the purchase transaction data. If one field is provided to store all of the purchase transaction data, it would be desirable to use a delimiter to separate the various data elements, such as name and address. Examples of suitable delimiters include commas, semicolons, and/or tabs, as is understood in the art. In certain embodiments of the invention, a plurality of fields will be used to store individual elements of the data, such as a field for name, a field for address, a phone number, among others. In the illustrated embodiment herein disclosed, application program 32 provides a series of screens or forms displayed on data display device 30. The screens will provide prompts, such as questions, requesting the user of the communication device to enter the relevant information for the particular question. Thus a screen may display a prompt asking for the new customer's name. The data input by the user of the device regarding the new customer's name may accordingly be stored in a designated field for holding a customer's name. The data may be stored in memory 22 until all of the purchase transaction data has been entered, or the data may be transmitted over a computer network to a data storage device without accumulating all of the data in the communication device. Additional prompts provided by application program 32 may include menus or lists, including drop down lists, and check boxes. These types of prompts are most useful when certain standard information is required (such as phone model or rate plan), and the user can select the listed options.

After the data has been input into the communication device 10, it may be transmitted over a computer network to a data storage device. The computer network may be any type of computer network including local area networks (LANs), wide area networks (WANs), and even a global communication network, such as the Internet. The computer network may be a hard-wired network, a wireless network, or a combination of the two. In the illustrated embodiment of the invention, the computer network comprises a wireless network between the handheld communication device and a computer at a wireless signal receiving station. The data storage device that stores the data of handheld communication product purchases may be any suitable device that can receive data transmitted over a computer network. For example, a suitable data storage device may be a database on a computer. As indicated above, the data may be transmitted over the computer network either after each element of data is entered into the communication device, or after all of the purchase transaction data is entered into the communication device. After the purchase transaction data is received by the telecom company, the data can be validated or verified for accuracy. For example, the credit card information can be checked to ensure that the new customer has acceptable credit. After validation of the purchase transaction data, a message may then be transmitted to the handheld communication device confirming completion of the order.

After the order is completed, the owner of the handheld communication device may then be rewarded by selecting one or more rewards for completing the sale of the handheld communication product. In the illustrated embodiment of the invention, the owner of the handheld communication device that was used to sell other communication products is rewarded by accumulating reward points. The points may be accumulated and may be redeemed for one or more other rewards, including, but not limited to, money, credit, such as credit towards communication services including phone time, or credit towards communication accessories, rebates, stock options, and frequent flyer miles. As the number of points increases, reflecting an increasing number of sales of handheld communication products, the value of the reward increases. The number of reward points accumulated by the owner of the handheld communication device can be stored in a database at a telecom company, and/or can be stored in the memory of the communication device.

Figure 2:
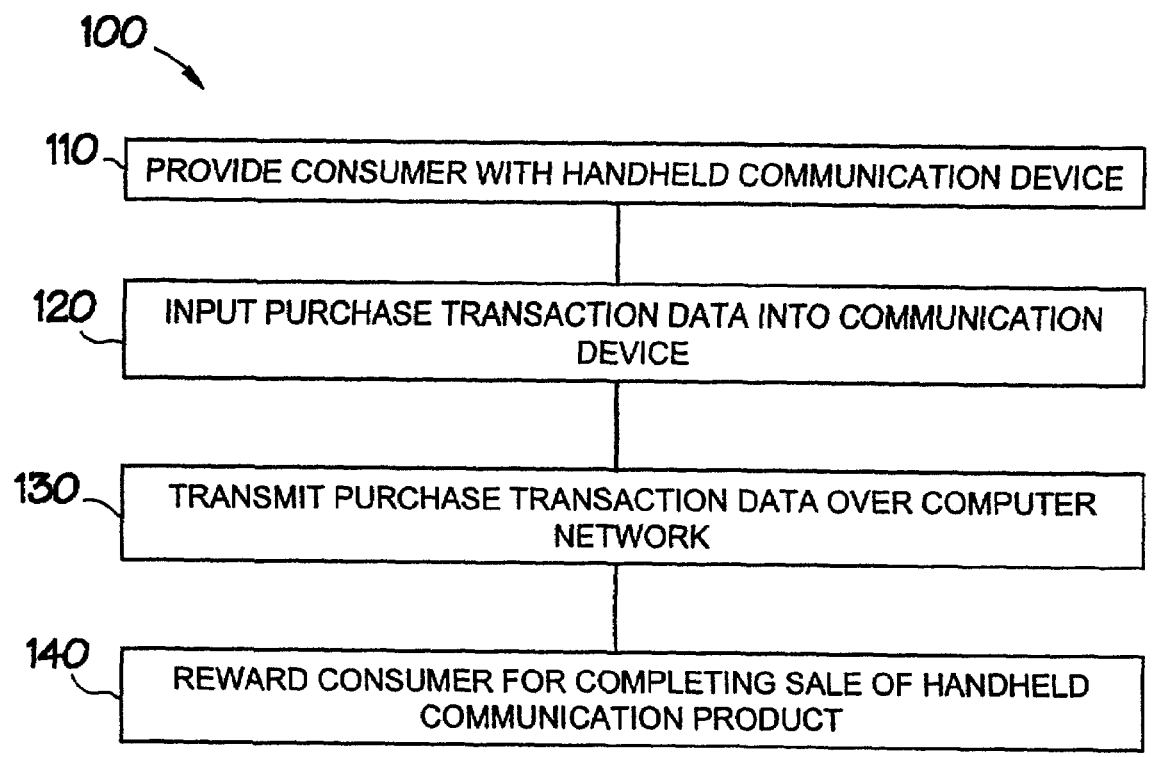
FIG. 2 is a flow chart illustrating a method of selling handheld communication products.

Accordingly, as illustrated in FIG. 2, a method 100 of selling portable handheld communication products may include step 110, which entails providing a consumer with a handheld communication device, such as disclosed in FIG. 1, step 120, comprising inputting purchase transaction data into the communication device, step 130, involving transmitting the purchase transaction data over a computer network, and step 140, which is to reward the consumer for completing the sale of the handheld communication product.

Figure 3:
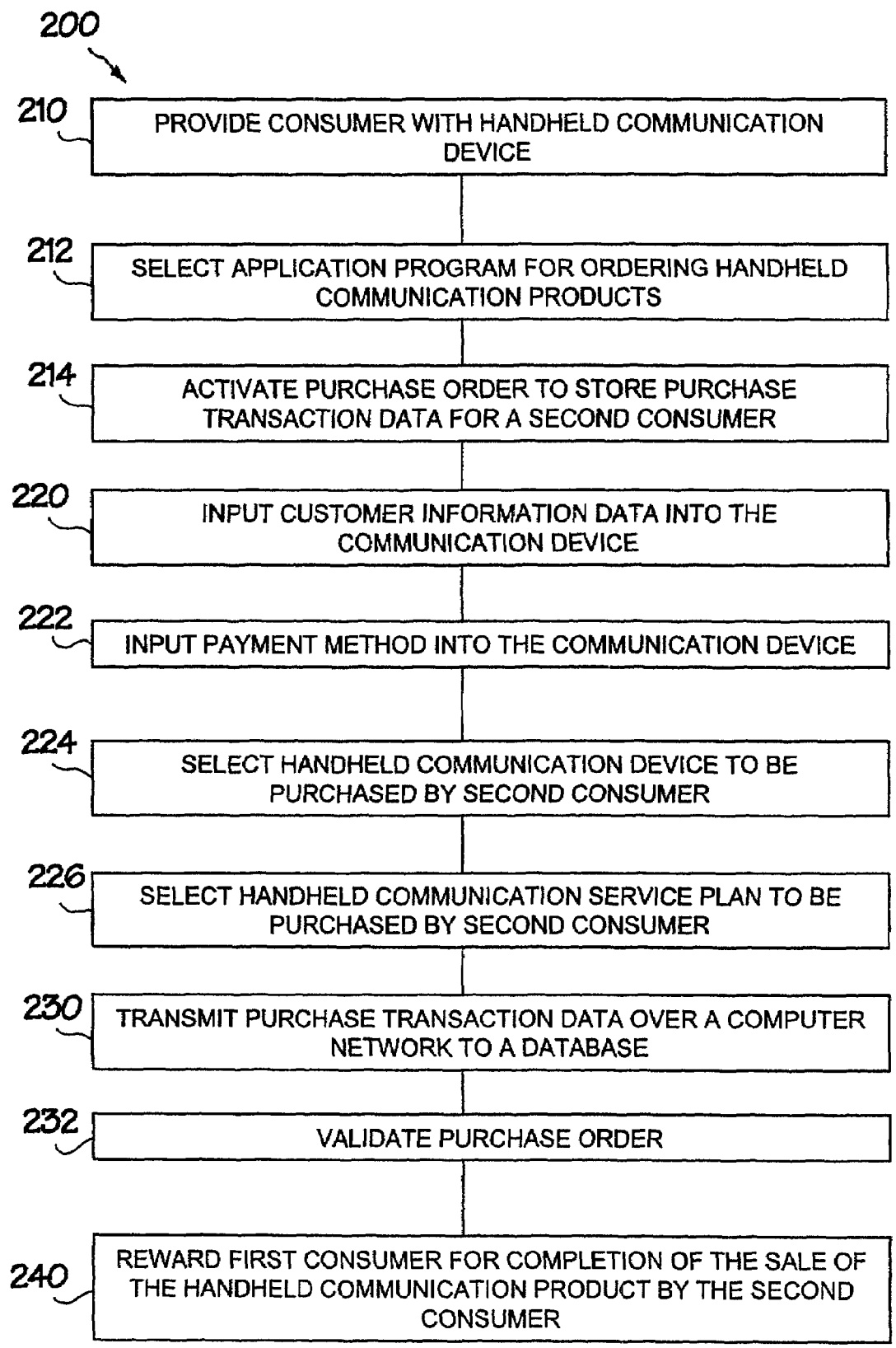
FIG. 3 is a flow chart illustrating another method of selling handheld communication products.

As illustrated in FIG. 3, another inventive method 200 for selling portable handheld communication products includes a step 210, of providing a consumer with a handheld communication device, such as the device disclosed in FIG. 1, and a step 212, of selecting an application program for ordering handheld communication products. Step 214 comprises activating a purchase order to store purchase transaction data for a second consumer, following which step 220 is undertaken, which involves inputting the purchase transaction data into the communication device. One or more payment methods are then input into the communication device, as shown in step 222, following which step 224, comprising selecting a handheld communication device to be purchased by the second consumer, is undertaken. Step 226 is then performed, involving selecting a handheld communication service plan to be purchased by the second consumer, and, as shown in step 230, the purchase transaction data is transmitted over a computer network to a database. The purchase order is validated (step 232), and the first consumer is rewarded, as shown in step 240, for completion of the sale of the handheld communication product by the second consumer.

The handheld communication device may also be provided with instructions, paper or electronic, for performing the methods, as disclosed herein. In certain embodiments of the invention, a reward may be provided to the user of the communication device for completing the instructions, and/or practicing the methods in a sample procedure.

The handheld communication device 10 may also be provided with the capability of displaying advertisements that may be directed to desired groups of people or target audiences. For example, one target group may include adolescents and young adults. Typically, this group is interested in having fun, getting money, and obtaining products at affordable costs. Advertisements, whether static or dynamic, may be provided to demonstrate how the communication device can be used to meet these interests. In addition, advertisements may be provided to provide rewards for educational or living expenses. A second target group may specifically be women. Advertisements may emphasize safety and security issues relevant to women. A third target group may be sales professionals, including real estate, stock, pharmaceutical, and medical device sales professionals. A fourth target group may include professionals, such as physicians, attorneys, accountants, and engineers. Messages or ads may be provided emphasizing the importance of data access in real time. A fifth target market may include corporate accounts or business customers. This group tends to make informed, technically sophisticated decisions. The communication device could be provided with one or more application programs allowing the company to customize the incentive options to increase sales and build customer and/or employee loyalty.

As the methods disclosed herein are intended to be used in connection with portable communication devices, the selling of the handheld communication products can be performed at the point of contact between the first consumer and the second consumer. Thus, by way of the present invention, portable handheld communication products may be efficiently sold without a significant time delay, or sold while the desire for buying such products is high. For example, the handheld communication products may be sold to a person during the initial meeting of that person with a person who already is in possession of a handheld communication device having an application program as described hereinabove. In addition, the person purchasing the handheld communication product may sell handheld communication products using the devices and methods disclosed herein.

Thus, methods of generating sales of handheld communication products are provided in the present invention that remedy the problems associated with time decay, and substantially reduces labor and advertising expenditures. In addition, the present invention reduces customer turnover and enhances customer retention due to the on-going reward system, as disclosed herein. Furthermore, because the owners of the handheld communication devices are capable of selling additional handheld communication products, each owner may be regarded as a client of the telecom company, and accordingly, will be provided with superior service and assistance by the telecom company.

The following specific examples are provided for purposes of illustration only. The examples are not to limit the scope of the invention, and one of ordinary skill in the art will readily appreciate that the invention can be variously practiced with the scope of the claims hereinbelow.

EXAMPLE 1

Figure 4:
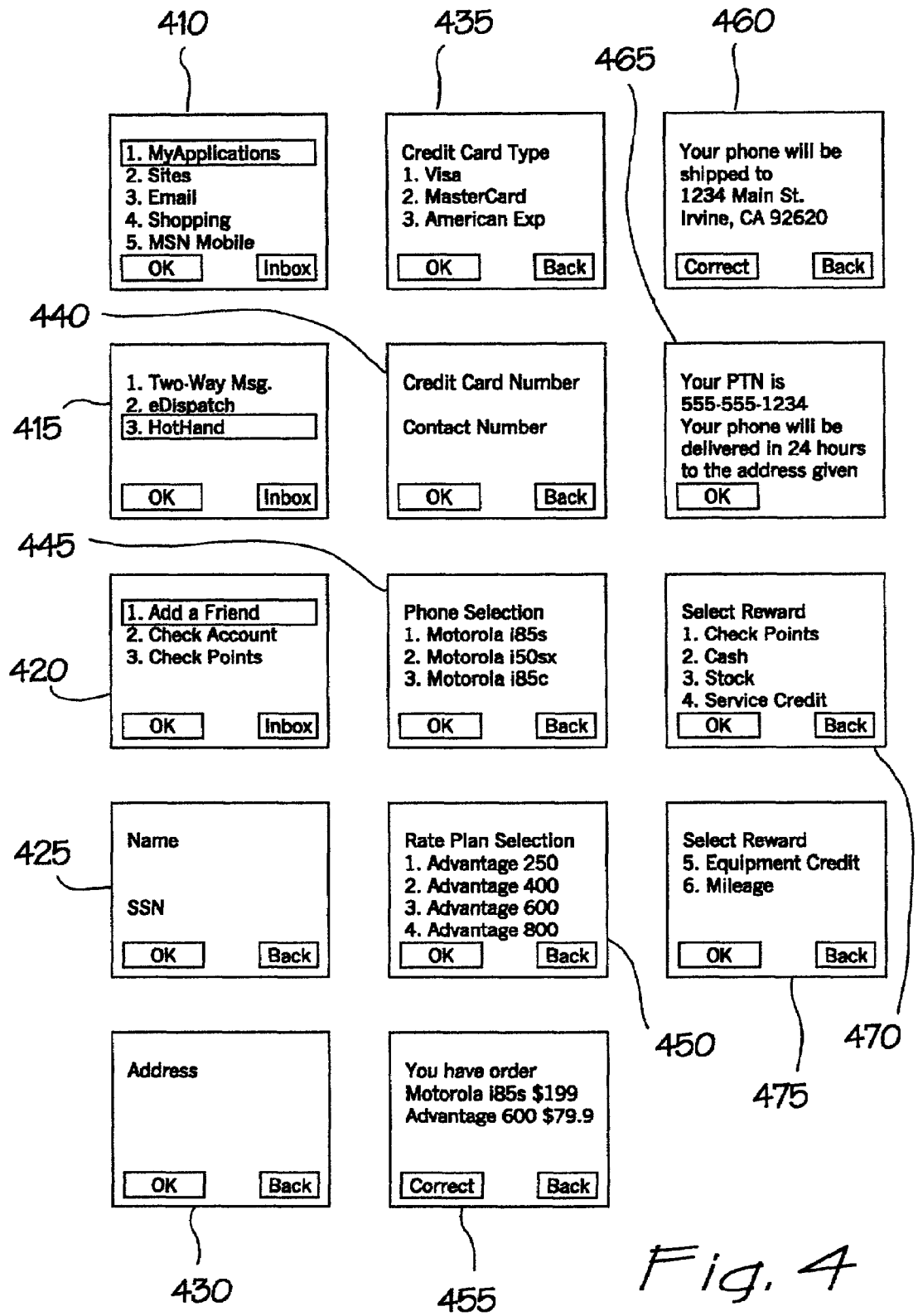
FIG. 4 illustrates a sequence of screen shots or forms displayed on a handheld communication device in accordance with the methods disclosed herein.

A portable wireless telephone is provided to a first consumer. The consumer has either purchased the wireless telephone from another owner of a similar telephone, or has purchased, or otherwise obtained the telephone from a telecom company. The consumer initiates a sale to a second consumer by pushing a single designated key. This key is preprogrammed to initiate the consumer-to-consumer purchase sequence (i.e., the application program for selling handheld communication devices). A first window (410 of FIG. 4) appears after the single key is pressed. Window 410 may be a conventional application window that lists one or more applications, such as, "My Applications", "Sites", "Email", "Shopping", "MSN Mobile", etc. The first consumer selects "My Applications" to display a second window 415, which provides choices, such as "Friends Network", Two-Way Msg", and/or "eDispatch". When the user selects "Friends Network", the next window 420 provides choices, such as "Check Account", or "Add Friend Purchase". By selecting "Add Friend Purchase", a fourth window 425 is displayed requesting the second consumer's name and social security number. The customer information can be entered by pushing keys on the phone's keypad, or can be entered by speaking into the phone's microphone. After the identification/registration information is completed, a fifth window

430 is displayed. Window 430 requests the customer's address information, which can also be entered by keypad or voice. A sixth window 435 provides different credit card type choices. After the appropriate credit card is chosen, a seventh window 440 will request credit card number and contact number. After inputting the credit card information, the credit of the customer can be checked or otherwise validated. After a successful validation, a list of available phones may be provided for the customer to select (Window 445). The phones may be provided for a fee, or may be provided free of charge. After selecting a phone, a ninth window 450 enables the customer to select a telephone rate plan. Examples include national one rate plans, or appropriate local area calling plans. After selecting a service plan, a tenth window 455 displays the purchase order, which may include the type of phone and service plan. The eleventh window 460 provides a shipment address verification for the customer. Window 465 may then display the personal telephone number (PTN) of the new customer's phone. A confirmation may also be provided indicating the shipment date and delivery address of the telephone.

Following the foregoing steps, status windows 470 and 475 may then be displayed to show the first consumer a number of options regarding the accumulated points from making such handheld product sales. For example, the first consumer can check his or her accumulated point total to date. The number of points may reflect the number of sales completed. In addition, depending on the number of points the first consumer has acquired, he may continue to save his points, or he may redeem the points for an award, such as cash, stock, credit to his service plan, telephone equipment credit, or frequent flyer miles.

After receiving the newly acquired telephone, the second consumer may now register, refer, and sell to other potential customers.

EXAMPLE 2

Figure 5:
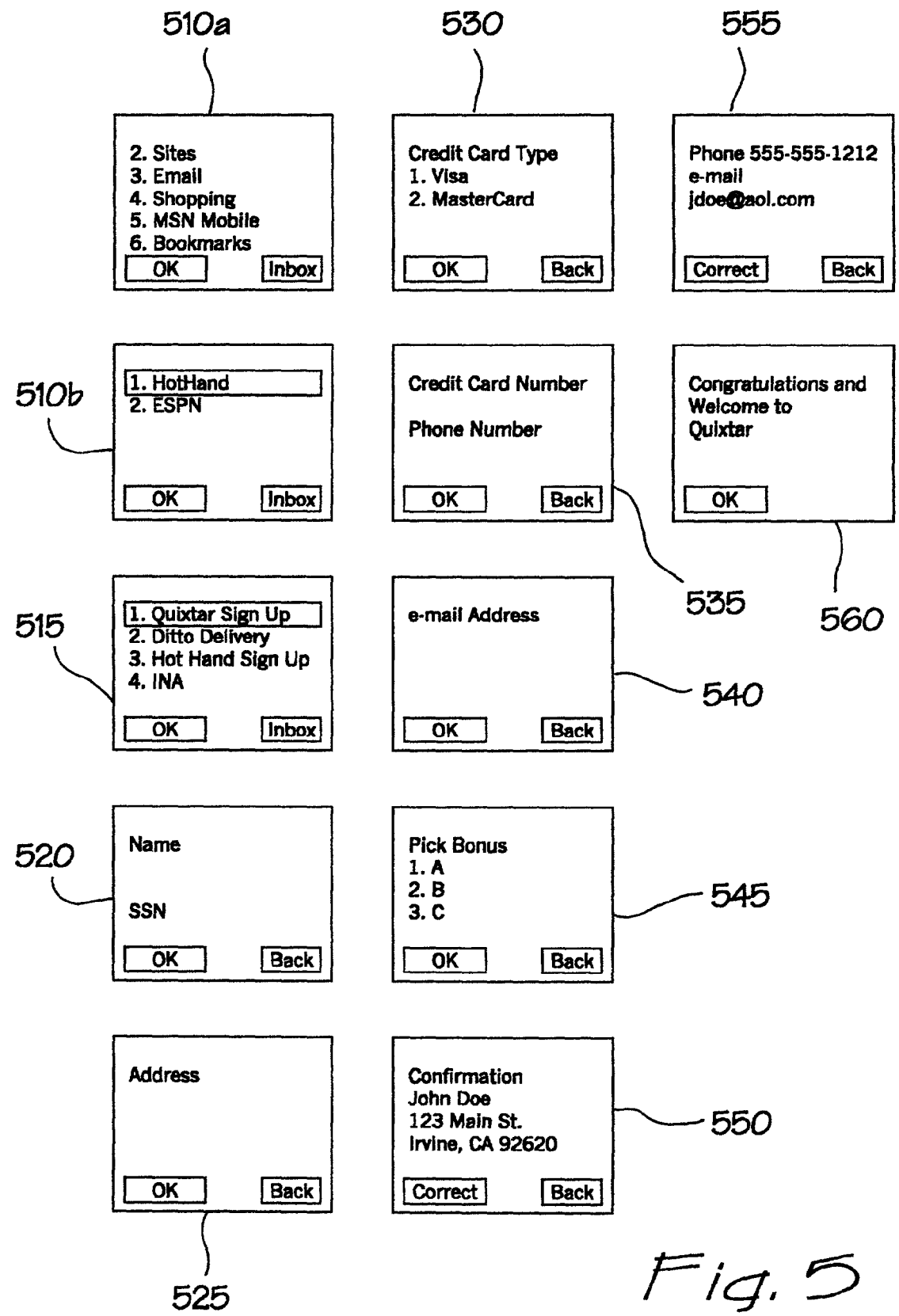
FIG. 5 illustrates a sequence of screen shots or forms displayed on a handheld communication device in accordance with the methods disclosed herein.

A user who has a handheld communication device in accordance with the present invention may push a designated key to access first windows 510a, 510b of FIG. 5. Windows 510a, 510b provide a list of applications that may be executed depending on the user's preference. For example, the user may select Hothand™ to activate a program that enables the user to enroll people in a network marketing practice. Another window 515 may then appear showing options, such as "Sign-up", "Scheduled Delivery", "Tools", "Functions", and/or "Hothand™ Purchase". If the user selects "Sign-up", a window 520 may appear, requesting the name and social security number of the new distributor/member of the network. Window 525 may then prompt for the new member's address information. After entry of the address, window 530 may allow a choice of credit card types, and upon entering the desired choice, a window 535 appears, requesting the credit card number and telephone number of the new member. A window 540 permits entry of the new member's email address, while another window 545 prompts the new member to select a bonus. The following window 550 provides a confirmation of the new member's registration with the network, and window 555 provides confirmation of the new member's telephone number and/or email address. A final window 560 may then provide a welcome screen with a greeting to the new member.

After becoming a new member or distributor, the new member may wish to purchase his own handheld communication device in accordance with the present invention. The new member would thus proceed back to Window 515 as illustrated in FIG. 5, on the first user's phone. From that point, the new member may select "Hot Hand Sign Up" (Window 515), and "Add a Friend" (Window 420—FIG. 4), and proceed in a similar manner as set forth in Example 1 above.

What is claimed is:

1. A method of selling portable handheld communication products, comprising:
   a. providing a first consumer with a portable handheld communication device, wherein the first consumer's portable handheld communication device is a wireless phone;
   b. inputting a second consumer's purchase transaction data into a first consumer's portable handheld communication device, wherein the purchase transaction data includes the second consumer's personal information and payment information necessary to complete a sale of a portable handheld communication product to the second consumer;
   c. transmitting the purchase transaction data for the second consumer over a communication network; and
   d. receiving a first consumer reward in exchange for completing the sale of the portable handheld communication product to the second consumer, the first consumer receiving the first consumer reward without having registered as a distributor or paid a sign-up fee.

2. The method of claim 1, wherein the purchase transaction data are input into the first consumer's portable handheld communication device by pressing one or more keys on a keypad communicatively coupled to the first consumer's portable handheld communication device.

3. The method of claim 1, wherein the purchase transaction data are input into the first consumer's portable handheld communication device by speaking into the first consumer's portable handheld communication device.

4. The method of claim 1, wherein the communication network comprises a wireless network.

5. The method of claim 1, wherein the communication network comprises a global communication network.

6. The method of claim 1, wherein the data storage device is a database.

7. The method of claim 1, wherein the inputting step is performed at a point of contact between the first consumer and the second consumer.

8. The method of claim 1, wherein the first consumer reward comprises one or more selections chosen from—cash, credit, stock options, and frequent flier miles.

9. The method of claim 1, wherein the second portable handheld communication product comprises a second consumer's portable handheld communication device, and further comprising:
   e. inputting a third consumer's purchase transaction data into the second consumer's portable handheld communication device, wherein the third consumer's purchase transaction data include the third consumer's personal information and payment information necessary to complete a sale of a portable handheld communication product to the third consumer;
   f. transmitting the purchase transaction data for the third consumer over a communication network; and
   g. receiving a second consumer reward in exchange for completing the sale of the third portable handheld communication product to the third consumer.

10. A method of selling portable handheld communication products, comprising:
   h. receiving a first portable handheld communication device;

i. selecting an application in the first portable handheld communication device to order a handheld communication product for a second consumer over a communication network;
j. initiating a sale by activating a purchase order form that stores data related to a purchase of the second portable handheld communication product by a second consumer;
k. inputting personal information data for the second consumer into the first portable handheld communication device and storing the personal information data using the purchase order form;
l. inputting payment method information data into the first portable handheld communication device;
m. selecting a second portable handheld communication device product to be purchased by the second consumer;
n. selecting a communication service plan associated with the selected portable handheld communication device product to be purchased by the second consumer;
o. transmitting the purchase order data over a communication network and storing the purchase order data in a database;
p. validating the payment method information data necessary to complete the sale; and
q. qualifying for a reward for completing the sale, without having been required to have registered as a distributor or to have paid a sign-up fee.

11. The method of claim 10, wherein the method is performed at a point of contact between a first consumer who received the first portable handheld communication device and the second consumer.

12. The method of claim 10, wherein the first consumer's portable handheld communication device is a wireless phone.

13. The method of claim 10, wherein the data is input into the first portable handheld communication device via a keyboard.

14. The method of claim 10, wherein the data is input into the first portable handheld communication device via a voice signal.

15. The method of claim 10, wherein the communication network comprises a global communication network.

16. The method of claim 10, wherein the communication network comprises a wireless network.

17. The method of claim 10, wherein the second consumer receives the second portable handheld device, and selects an application in the second portable handheld communication device to order a third handheld communication product for a third consumer over the communication network, the application executing a method that:
r. initiates a sale by activating the purchase order form to store data related to a second purchase of the third portable handheld communication product by the third consumer;
s. receives input of personal information data for the third consumer into the second portable handheld communication device and stores the personal information data using the purchase order form;
t. receives input of payment method information data into the first consumer's portable handheld communication device;
u. allows the third consumer to select the third portable handheld communication device product to be purchased and to select a communication service plan associated with the selected third portable handheld communication device product;
v. transmits the purchase order data over the communication network and stores the purchase order data in a database;
w. receives validation of the payment method information data necessary to complete the sale; and
x. qualifies the second consumer for a reward for completing the second sale, without requiring the second consumer to have registered as a distributor or to have paid a sign-up fee.

18. The method of claim 10, further comprising accumulating reward points for each sale completed, the reward points being accumulated to increase the value of the reward selected by the first consumer.

* * * * *